United States Patent [19]

Nakamura et al.

[11] 4,043,634

[45] Aug. 23, 1977

[54] LIQUID CRYSTAL ELECTRO OPTICAL ELEMENT

[75] Inventors: Kenji Nakamura; Toshio Jinnai; Kazuo Totani, all of Kanagawa; Shigetaro Furuta, Fujisawa, all of Japan

[73] Assignee: Dai Nippon Toryo Co., Ltd., Osaka, Japan

[21] Appl. No.: 532,602

[22] Filed: Dec. 13, 1974

[30] Foreign Application Priority Data

| July 25, 1974 | Japan | 49-84568 |
| July 25, 1974 | Japan | 49-84569 |
| Aug. 31, 1974 | Japan | 49-100137 |
| Sept. 5, 1974 | Japan | 49-101348 |
| Sept. 5, 1974 | Japan | 49-101349 |
| Sept. 5, 1974 | Japan | 49-101350 |

[51] Int. Cl.$^2$ .................. C09K 3/34; G02F 1/13
[52] U.S. Cl. .................. 350/160 LC; 252/299; 252/408; 58/23 R
[58] Field of Search .................. 252/299, 408; 350/160 LC

[56] References Cited

U.S. PATENT DOCUMENTS

| 3,815,972 | 6/1974 | Hsieh | 252/299 |
| 3,853,391 | 12/1974 | Jorkin | 350/160 LC |
| 3,872,140 | 3/1975 | Klanderman et al. | 252/408 |
| 3,880,767 | 4/1975 | Chang et al. | 252/299 |
| 3,891,307 | 6/1975 | Tsukamoto et al. | 350/160 LC |
| 3,900,248 | 8/1975 | Nagasaki | 350/160 LC |
| 3,927,064 | 12/1975 | Boller et al. | 252/299 |
| 3,975,286 | 8/1976 | Oh | 252/299 |
| 3,977,768 | 8/1976 | Nakamura et al. | 252/299 |

FOREIGN PATENT DOCUMENTS

| 2,321,632 | 11/1974 | Germany | 252/299 |
| 2,306,738 | 8/1973 | Germany | 252/299 |
| 49-62390 | 6/1974 | Japan | 252/299 |
| 49-38888 | 4/1974 | Japan | 252/299 |
| 48-69775 | 9/1973 | Japan | 252/299 |
| 49-34488 | 3/1974 | Japan | 252/299 |

*Primary Examiner*—Benjamin R. Padgett
*Assistant Examiner*—T. S. Gron
*Attorney, Agent, or Firm*—Oblon, Fisher, Spivak, McClelland & Maier

[57] ABSTRACT

A liquid crystal electro-optical element which comprises a nematic liquid crystal composition having a positive dielectric anisotropy which is composed of p-n-alkylbenzylidene-p'-cyanoaniline and an improver selected from the group consisting of p-n-alkyl cyanobenzene, p-alkylbenzylidene-p'-alkoxyaniline, and p-alkoxybenzylidene-p'-n-alkylaniline.

6 Claims, No Drawings

4,043,634

LIQUID CRYSTAL ELECTRO OPTICAL ELEMENT

BACKGROUND OF THE INVENTION

1. Field of the Invention

The present invention relates to liquid crystal electro-optical elements which are used for display devices. More particularly, it relates to a novel twisted effect type liquid crystal electro-optical element (hereinafter referred to as a TN type display element) which comprises nematic liquid crystal material having positive dielectric anisotropy (hereinafter referred to as "$N_p$ liquid crystal") between a pair of electrode plates.

2. Description of the Prior Art

Nematic liquid crystal material (hereinafter referred to as N-liquid crystal) has been used in the past for electro-optical display elements because its optical characteristics are changed by an applied voltage. Heretofore, it has also been known that p-alkylbenzylidene-p'-cyanoanilines having the formula:

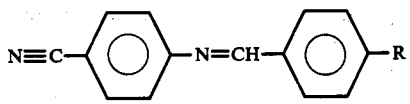

wherein R is an n-propyl, n-butyl, n-pentyl or n-hexyl group, can be used as an $N_p$ liquid crystal which has an electric dipole moment in parallel to the longer axis of the molecule. Twist-effect type liquid crystal electro-optical elements utilized in the field effect mode, that is, the mode wherein applied voltage causes a change of twist or slant of said $N_p$ - liquid crystal molecules (p-alkylbenzylidine-p'-cyanoanilines), can be actuated by a quite low voltage, such as about 1.5 V for a 10% change of transmittance and about 2 V for a 90% change of transmittance. However, it is most desirable to be able to actuate a TN type display element by an even lower voltage.

SUMMARY OF THE INVENTION

Accordingly, it is an object of the present invention to provide a twist-effect type liquid crystal electro-optical element which has a low operating voltage.

It is another object of the invention to provide a twist-effect type liquid crystal electro-optical element which can be actuated by a voltage low enough so that it can be easily directly connected to a C-MOS-IC circuit. This enables improvement in circuit design, increase in circuit reliability and decrease in consumption of power. Additionally, the selection of the LSI and the IC for the driving circuits can be made from a larger number of candidates and the twist-effect type electro-optical element can be compacted and lightened.

These and other objects of the invention, as will hereinafter be made clear by the discussion below, have been attained by providing a liquid crystal electro-optical element which comprises a nematic liquid crystal composition having positive dielectric anisotropy which is composed of p-n-alkylbenzylidene-p'-cyanoaniline having the formula

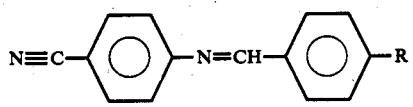

wherein R represents an n-propyl, n-butyl, n-pentyl or n-hexyl group; and an improver selected from the group consisting of p-n-alkyl cyanobenzene; p-alkoxybenzylidene-p'-n-alkylaniline and p-alkylbenzylidene-p'-alkoxyaniline.

DETAILED DESCRIPTION OF THE PREFERRED EMBODIMENTS

Suitable structures for the liquid crystal electro-optical elements include those disclosed in U.S. Pat. No. 3,731,986. These structures comprise a layer of neumatic liquid crystal material at room temperature which is disposed between transparent parallel plates, one of which is coated with a film of transparent conducting material and the other of which is partially coated with a film of conducting material or the like on selected areas. The liquid crystal electro-optical element is disposed between and parallel to a pair of polarizers such that when an electrical potential is applied across the conducting films and the liquid crystal layer, the element will change from a light transmitting to an opaque medium or vice versa, depending upon the orientation of the two polarizers. The structure of the liquid crystal electro-optical element of the present invention is not limited to those of the disclosure and can be that of other conventional TN type display elements.

The p-n-alkylbenzylidene-p'-cyanoanilines used in the invention are preferably p-n-propylbenzylidene-p'-cyanoaniline or p-n-hexylbenzylidene-p'-cyanoaniline. The neumatic liquid crystal temperature range of p-n-propylbenzylidene-p'-cyanoaniline is 65° – 78° C and that of p-n-hexyl benzylidene-p'-cyanoaniline is 33° – 65° C. The crystal-nematic phase transition point (hereinafter referred to as the CN point) of the mixture of p-n-propyl benzylidene-p'-cyanoaniline and p-n-hexyl-benzylidene is decreased because of cryoscopic phenomena. For this reason, it is preferable to mix p-n-propyl benzylidene-p'-cyanoaniline with p-n-hexyl benzylidene-p'-cyanoaniline at a ratio of from 1 : 1 to 4 : 21 (CN point is lower than -10° C) especially from 2 : 3 to 1 : 4 (CN point is lower than -18° C) and most preferably 3 : 7 (CN point is about -22° C). These mixtures are in the nematic liquid crystal state at room temperature and remain so for a broad temperature range.

The p-n-alkyl cyanobenzenes used in the invention as improvers have the formula

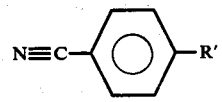

wherein R' is an n-propyl, n-butyl, n-pentyl or n-hexyl group. The p-n-alkyl cyanobenzenes are p-n-propyl cyanobenzene, p-n-butyl cyanobenzene, p-n-pentyl cyanobenzene and p-n-hexyl cyanobenzene or mixtures thereof. These compounds can be prepared by reacting p-n-alkylchlorobenzene or p-n-alkyl bromobenzene with copper cyanide, $Cu_2(CN)_2$, in a solvent of dimethyl formamide or methyl pyrrolidone. The p-n-alkyl cyanobenzene is preferably admixed with the p-n-alkyl benzylidene-p'-cyanoaniline at a ratio of from 10 : 90 to 3 : 97 by weight, especially from 8 : 92 to 4 : 96. In the case where less than 3 wt% of the p-n-alkyl cyanobenzene is used, the operating voltage is not low enough. On the other hand, the nematicisotropic phase transition point is lowered by increasing the p-n-alkyl cyanobenzene concentration. In the case where higher than 10 wt% of the p-n-alkyl cyanobenzene is used, the temperature range of the liquid crystal state is relatively narrow. The miscibility of the p-n-alkyl cyanobenzene is not high and may be improved by the other additives.

The twist-effect type liquid crystal electro-optical element of the invention is suitable for use an an electronic time display device, especially as an electronic watch which is driven by application of 1.5 volts at a specific duty ratio. The element can be operated by passing a small current of only $1 - 10\mu A/cm^2$, usually about $3\mu A/cm^2$. The element can also be used with a multiplex drive system such as a two frequency drive system or a voltage means system. However, it is especially preferable in a time system to use it in conjunction with a special multiplex drive system wherein two types of DC rectangular waves are generated and are separately applied to blocked electrodes. AC rectangular waves are then correspondingly produced. The display is effected by the different duty ratio of the composit AC rectangular wave produced by the phase difference between the two types of DC rectangular waves. The duty ratio of the AC rectangular wave is selected in accordance with the type of blocked electrodes employed. When the duty ratios are ⅔ and 174, the difference in the duty ratios of the rectangular waves applied in the turn-on and turn-off periods can be a maximum whereby the contrast ratio is also a maximum.

An electronic watch is composed of a nematic liquid crystal display device comprising a nematic liquid crystal electro-optical element and a drive circuit for the element; a time control device comprising a quartz oscillating element and a frequency division circuit; and a small silver battery. In general, the current capacity of the silver battery for a watch is about 105 - 210 mAH. In order to minimize the consumption of power of the silver battery, it is preferable to match the operating voltage of the element with the voltage of the battery. The operating voltage of a TN type display element using the conventional nematic liquid crystal is about 3 - 10 volts and is quite higher than the voltage of the battery, 1.5 volts. Accordingly, two or more silver batteries are required for driving the element. When p-alkylbenzylidene-p'-cyanoaniline is used as the nematic liquid crystal for the element, the operating voltage can be about 1.5 volts. However, p-n-propylbenzylidene-p-cyanoaniline, p-n-hexylbenzylidene-p-cyanoaniline or a mixture thereof is placed into a cell having conductive electrodes coated with poly-p-xylene which is orientated by rubbing its surface, the operating voltage at a duty ratio of ⅔ is 1.43 volts and the threshold voltage at a duty ratio of ⅓ is 1.48 volts. When the liquid crystal composition is sealed in a cell treated by the Si slant vapor deposition which allows orientation of the liquid crystal on the electrode surface, the operating voltage in duty ⅔ is 1.23 $V_{op}$, and the operating voltage in duty ⅓ is 1.34 $V_{op}$. In this case, it is impossible to have the picture elements turn-on at a duty ratio of ⅔ and turn-off at a duty ratio of ⅓. Instead, all of the picture elements are turned on regardless of the duty ratio. For the analogue integrating display in the multiplex drive system, the TN type display element for the electronic watch should have a threshold voltage at a duty ratio of ⅔ ($V_{th}$- ⅔) of less than 1.5 volts, and a threshold voltage at a duty ratio of ⅓ ($V_{th}$- ⅓) of higher than 1.5 volts. As the output voltage of the silver battery is 1.51 - 1.40 volts, it is preferable to have a $V_{th}$- $\mu$ of less than 1.40 volts and $V_{th}$- ⅔ of higher than 1.51 volts and an operating voltage at a duty ratio of ⅔ ($V_{op}$ - ⅔) less than 1.40 volts.

The p-alkyl benzylidene-p'-alkoxyanilines used in the invention as improvers have the formula

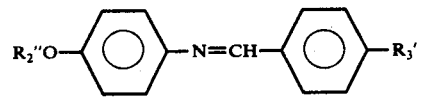

wherein R"$_2$ and R'$_3$ are the same or different and are respectively methyl, ethyl, n-propyl, n-butyl, n-pentyl, n-hexyl, n-heptyl or n-octyl groups.

Suitable p-alkylbenzylidine-p'-n-alkoxyanilines are p-propylbenzylidiene-p'-n-methoxyaniline, p-propylbenzylidene-p'-n-ethoxyaniline, p-butylbenzylidene-p'-n-methoxyaniline, p-butylbenzylidene-p'-n-ethoxyaniline, p-pentylbenzylidene-p'-n-methoxyaniline, p-pentylbenzylidene-p'-n-ethoxyaniline, p-hexylbenzylidene-p'-n-methoxyaniline, p-hexylbenzylidene-p'-n-ethoxyaniline, p-hexylbenzylidene-p'-n-propoxyaniline, and p-hexylbenzylidene-p'-n-butoxyaniline. These compounds can be prepared by mixing p-alkoxyaniline and p-alkylbenzaldehyde and an alcohol and heating the mixture under reflux conditions for 2 hours, followed by purifying by recrystallizing from an alcohol solution. These compounds have excellent miscibility with the p-n-alkylbenzylidene-p'-cyanoanilines. The p-alkylbenzylidene-p'-n-alkoxyaniline is preferably admixed with the p-n-alkylbenzylidene-p'-cyanoaniline in a ratio of from 50 : 50 to 5 : 95 by weight. When the amount of p-alkylbenzylidene-p'-alkoxyaniline is less than 5 wt%, it is difficult to effect a turn-on in duty ⅔ and a turn-off in duty ⅓. All of the display picture elements instead are in an ON state in both dury ⅔ and duty ⅓. When the amount of p-alkylbenzylidene-p'-alkoxyaniline is higher than 50 wt%, the threshold voltage in duty ⅔ is higher than 1.5 volts, whereby it is impossible to use it in a TN type display device driven by 1.5 volts. The composition is stable as compared with the p-n-alkylbenzylidene-p'-cyanoaniline itself. Suitable p-alkoxybenzylidene-p'-n-alkylanilines used in the invention as improvers include p-methoxybenzylidene-p'-n-butylaniline (MBBA), p-ethoxybenzylidene-p'-n-butylaniline (EBBA), p-methoxybenzylidene-p'-n-heptylaniline (MBH$_p$A), p-ethoxybenzylidene-p'-n-heptylaniline (EBH$_p$A), or mixtures thereof. The p-alkoxylbenzylidene-p'-n-alkylaniline is preferably admixed with p-n-alkylbenzylidene-p'-cyanoaniline at a ratio of from 2 : 2 to 1 : 19 by weight. The p-alkoxybenzylidene-p'-n-alkylanilines, especially the mixtures of said MBBA, EBBA, EBH$_p$A and/or MBH$_p$A, can form nematic liquid crystals having negative dielectric anisotropy (N$_n$-liquid crystal). The p-alkoxylbenzylidene-p'-n-alkylaniline is preferably incorporated in an amount of from 5–50 wt.%. The improvers composed of MBBA, EBBA, MBH$_p$A and EBH$_p$A are preferably selected to give a broad range of nematic liquid crystal temperatures. When MBBA, EBBA and EPH$_p$A are pre-mixed, the subsequent mixture of MBBA, EBBA, EBH$_p$A and MBH$_p$A can be formed as follows:

| MBBA, EBBA and EBH$_p$A Mixtures | | | Resultant Mixture | | | |
|---|---|---|---|---|---|---|
| MBBA | EBBA | EBH$_p$A | MBBA | EBBA | EBH$_p$A | MBH$_p$A |
| 1 | 1 | 2 | 5 | 57 | 23 | 15 |
| 11 | 11 | 8 | 9 | 56 | 21 | 14 |
| 3 | 3 | 4 | 13 | 54 | 20 | 13 |

-continued

| MBBA, EBBA and EBH$_p$A Mixtures | | | Resultant Mixture | | | |
|---|---|---|---|---|---|---|
| MBBA | EBBA | EBH$_p$A | MBBA | EBBA | EBH$_p$A | MBH$_p$A |
| 1 | 1 | 4 | 19 | 53 | 18 | 10 |
| 7 | 7 | 6 | 22 | 52 | 17 | 9 |
| 2 | 2 | 1 | 31 | 50 | 14 | 5 |

The liquid crystal electro-optical element of this invention is a twisted-effect type liquid crystal electro-optical element (TN type display element) which is driven by applying a low voltage, such as less than 1.5 volt, under a specific duty ratio in a multiplexing technique. The TN type display element is suitable for an electron-watch and other small display device. The TN type display element is prepared by placing the nematic liquid crystal composition into a cell comprising a pair of parallel plates and a pair of electrodes consisting of transparent conductive membrances coated onto the plates at the inner surface of the cell. The surfaces of the electrodes are treated by a slant deposition method with SiO, MgF$_2$, CeO$_2$ or a rubbing method, etc. to allow orientation of the liquid crystal. In one of the rubbing methods, an organic high molecular weight material is coated onto the surface of the electrodes and the coated surface is rubbed along one direction by conventional means. Suitable organic high molecular weight materials include the usual resins for adhesives and coatings including thermosetting resins, e.g., urea resin, melamine resins, phenolic resins, epoxy resins, unsaturated polyesters, alkyd resins, urethane resins, resorcin resins, furan resins and silicon resins; and thermoplastic resins which are usually used for coating. The organic high molecular weight material can be applied on the electrode plates by first dissolving it in a suitable solvent followed by spray coating, dip coating, brush coating, roller coating, etc. and drying. It is also possible to apply overcoating by suitable means. It is also possible to coat the surface of the electrode with an inorganic compound such as SiO, MgF$_2$, CeO$_2$. The thickness of the overcoat is usually less than about 5μm, especially less than 1μm, in the case of the organic high molecular weight material and is usually less than about 1μm, especially less than 0.1μm, in the case of the inorganic material. The coated surface is oriented by rubbing along one direction with fabric or paper. The gap between the electrodes is usually 1 - 50μm for the TN type display element used for an electron-watch. The molecules of the N$_p$-liquid crystal are oriented on the surface of the electrode and parallel to the direction of the molecules of the membrane coated on the electrode. However, between the electrodes, they are oriented perpendicular to the surface of the electrode with a 90° twist. Consequently, the plane of polarization of polarized light is rotated about 90°. Accordingly, when the TN type display element is disposed between a pair of polarizers and a certain voltage is applied between the electrodes, the molecules of the liquid crystals are substantially oriented parallel to the electric field, whereby, light is transmitted in the case of parallel polarizers and light is blocked in the case of perpendicular polarizers. This phenomenon is utilized for the TN type display element.

A typical application of this liquid crystal electro-optical element is in electronic time display devices which are well-known and are disclosed in, for example, U.S. Pat. No. 3,505,804 and the copending U.S. Pat. application Ser. No. 448,692 filed Mar. 6, 1974, U.S. Pat. No. 3,969,887 Ser. No. 10618/1974; West Germany Ser. No. P 24 10 527.9; French Ser. No. 7407838; Swiss Ser. No. 3141/1974).

It is preferable to operate these display devices by applying a plurality of different pulses to produce the effective value of voltage which is the voltage above a threshold voltage for turn-on and a voltage below a threshold voltage for turn-off.

The TN type display element of the invention can be effectively used in a TN type display device for electronic time display which is driven by application of 1.5 volts under a specific duty ratio in the multiplex drive system disclosed in U.S. application Ser. No. 433,352, filed Jan. 14, 1974, now abandoned (United Kingdon Ser. No. 6659/1974; West German Ser. No. P 24 03 172.9; French Ser. No. 74 02 546; Swiss Ser. No. 1414/1974).

In accordance with the invention, the operating voltage $V_{op}$ (voltage zero to peak) of the liquid crystal electro-optical element can be decreased, so that the life of the element can be prolonged. It is also possible to produce a threshold voltage in duty ¾ which is lower than 1.5 $V_{op}$, so that the element can be effectively driven with a 1.5 volt electric cell.

Having generally described the invention, a more complete understanding can be obtained by reference to certain specific examples, which are included for purposes of illustration only and are not intended to be limiting unless otherwise specified.

EXAMPLES 1-29

A mixture of p-n-propylbenzylidene-p'-cyanoaniline (PBCA) and p-n-hexylbenzylidene-p'-cyanoaniline (HBCA)(N$_p$ liquid crystal) was charged into a flask purged with nitrogen and was heated at 70° C and the liquid mixture was stirred. The improvers shown in Table 1 were added to the liquid mixture with stirring whereby nematic liquid crystals having positive dielectric anisotropy were produced. The nematic liquid crystal phase temperature ranges (nematic phase range) of the resulting nematic liquid crystals are shown in Table 1. The resulting nematic liquid crystal was charged into a cell having a pair of glass plates coated with transparent conductive films as electrodes. The latter were treated by the slant deposition of SiO so as to orient the liquid crystal and prepare a twisted-effect type liquid crystal electro-optical element (TN display element) (15 μm of gap between the electrode; 10° depositing angle in the slant deposition of SiO; perpendicular direction of SiO treatment; a pair of polarizers being disposed). The operating voltage for a 10% change in transmission coefficient (V-10) and the operating voltage for a 90% change of transmission coefficient (V-90) for the TN display elements was measured at 25° C by a rectangular wave having a frequency of 32 Hz.

Table 1

| | N$_p$ liquid crystals | | Improver type and ratio to liquid crystals | | Nematic phase range (° C) | V-10 (V) | V-90 (V) |
|---|---|---|---|---|---|---|---|
| | PBCA (%) | HBCA (%) | PCB (%) | HCB (%) | | | |
| Exp. 1 | 40 | 60 | 3/97 | | < −18 to 55 | 1.21 | 1.90 |

Table 1-continued

| | $N_p$ liquid crystals | | Improver type and ratio to liquid crystals | | Nematic phase range (° C) | V-10 (V) | V-90 (V) |
|---|---|---|---|---|---|---|---|
| | PBCA (%) | HBCA (%) | PCB (%) | HCB (%) | | | |
| | 40 | 60 | 0 | | <−18 to 61 | 1.49 | 2.00 |
| Exp. 2 | 30 | 70 | 3/97 | | <−18 to 55.5 | 1.14 | 1.90 |
| | 30 | 70 | 0 | | <−18 − 62 | 1.48 | 2.00 |
| Exp. 3 | 20 | 80 | 3/97 | | <−18 to 56 | 1.23 | 1.87 |
| | 20 | 80 | 0 | | <−18 to 62 | 1.50 | 2.00 |
| Exp. 4 | 40 | 60 | 4/96 | | <−18 to 52 | 1.11 | 1.80 |
| Exp. 5 | 30 | 70 | 4/96 | | <−18 to 52 | 1.11 | 1.80 |
| Exp. 6 | 20 | 80 | 4/96 | | <−18 to 53 | 1.15 | 1.78 |
| Exp. 7 | 40 | 60 | 8/92 | | <−18 to 42 | 1.05 | 1.54 |
| Exp. 8 | 30 | 70 | 8/92 | | <−18 to 43 | 1.04 | 1.53 |
| Exp. 9 | 20 | 80 | 8/92 | | <−18 to 44 | 1.06 | 1.52 |
| Exp. 10 | 40 | 60 | 10/90 | | <−18 to 37 | 1.02 | 1.44 |
| Exp. 11 | 30 | 70 | 10/90 | | <−18 to 37 | 1.03 | 1.43 |
| Exp. 12 | 20 | 80 | 10/90 | | <−18 to 39 | 1.02 | 1.42 |
| Exp. 13 | 40 | 60 | | 3/97 | <−18 to 53 | 1.25 | 1.85 |
| Exp. 14 | 30 | 70 | | 3/97 | <−18 to 53 | 1.25 | 1.88 |
| Exp. 15 | 20 | 80 | | 3.97 | <−18 to 54 | 1.27 | 1.82 |
| Exp. 16 | 40 | 60 | | 4/96 | <−18 to 51 | 1.20 | 1.80 |
| Exp. 17 | 30 | 70 | | 4/96 | <−18 to 51 | 1.10 | 1.80 |
| Exp. 18 | 20 | 80 | | 4/96 | <−18 to 51 | 1.22 | 1.77 |
| Exp. 19 | 40 | 60 | | 8/96 | <−18 to 40 | 1.05 | 1.54 |
| Exp. 20 | 30 | 70 | | 8/96 | <−18 to 40 | 1.04 | 1.53 |
| Exp. 21 | 20 | 80 | | 8/96 | <−18 to 40 | 1.07 | 1.55 |
| Exp. 22 | 40 | 60 | | 10/90 | <−18 to 30 | 1.00 | 1.42 |
| Exp. 23 | 30 | 70 | | 10/90 | <−18 to 30 | 0.98 | 1.40 |
| Exp. 24 | 20 | 80 | | 10/90 | <−18 to 30 | 1.01 | 1.49 |
| Exp. 25 | 40 | 60 | 2/96 | 2/96 | <−18 to 51 | 1.25 | 1.75 |
| Exp. 26 | 30 | 70 | 2/96 | 2/96 | <−18 to 51 | 1.15 | 1.77 |
| Exp. 27 | 20 | 80 | 2/96 | 2/96 | <−18 to 51 | 1.15 | 1.78 |
| Exp. 28 | — | 100 | 3/97 | — | 27–53 | 1.30*1 | 1.86*1 |
| " | — | 100 | 0 | 0 | 33–65 | 1.50*1 | 2.00*1 |
| Exp. 29 | — | 100 | | 3/97 | 26–52 | 1.27*1 | 1.85*1 |

*1the voltage was measured at 40° C
PBCA = p-n-propylbenzylidene-p'-cyanoaniline
HBCA = p-n-hexylbenzylidene-p'-cyanoaniline
PCB = p-n-propylcyanobenzene
HCB = p-n-hexylcyanobenzene As is clear from Table 1, the voltages V-10 of the examples were lower than the 1.49 volts for the no additive case, and the voltages V-90 of the examples were lower than the 2.00 volts for the no additive case.

EXAMPLE 30

A mixture of 40 wt% of p-n-propylbenzylidene-p-cyanoaniline (PBCA) and 60 wt% of p-n-hexylbenzylidene-p'-cyanoaniline (HBCA) ($N_P$ liquid crystal) was charged into a flask purged with nitrogen and was heated at 70° C and the liquid mixture was stirred. An improver mixture of 50 wt% of p-n-hexylbenzylidene-p'-methoxyaniline and 50 wt% of p-n-hexylbenzylidene-p'-ethoxyaniline was added to the liquid mixture with stirring, whereby nematic liquid crystals having positive dielectric anisotropy were produced. The nematic liquid crystal phase temperature ranges of the resulting nematic liquid crystals are shown in Table 2. The nematic liquid crystals were charged into a cell having a pair of glass plates coated with transparent conductive films as electrodes. The latter were treated by depositing poly-p-xylene in thickness of 2000 Å and rubbing the membrane under a pressure of 10 g/cm² to orient the molecules of the membrane (electrode gap of 15μm, and prepare the twisted-effect type liquid crystal electro-optical elements. (TN display elements). The threshold voltage for a rectangular wave having a duty ratio of ⅔ ($V_{th}$-⅔), the operating voltage for a rectangular wave having a duty ratio of ¼ ($V_{ope}$-¼) and the threshold voltage for a rectangular wave having a duty ratio of ¼ ($V_{th}$-¼) were measured for the TN display elements. The results are shown in Table 2.

Table 2

| $N_p$ liquid crystal | concentration of improver (wt.%) | nematic phase range (° C) | $V_{th}$-⅔ ($V_{op}$) | $V_{ope}$-¼ ($V_{op}$) | $V_{th}$-¼ ($V_{op}$) |
|---|---|---|---|---|---|
| PBCA + HBCA (40%) (60%) | 5 | −20 to 63 | 1.20 | 1.32 | 1.59 |
| " | 10 | −20 to 63 | 1.18 | 1.26 | 1.52 |
| " | 15 | −18 to 63 | 1.20 | 1.29 | 1.55 |
| " | 20 | −16 to 64 | 1.25 | 1.35 | 1.60 |
| " | 25 | −15 to 64 | 1.33 | 1.45 | 1.66 |
| " | 30 | −12 to 64 | 1.41 | 1.56 | 1.75 |
| " | 35 | −10 to 64 | 1.45 | 1.67 | 1.84 |
| " | 40 | −5 to 65 | 1.46 | 1.77 | 1.92 |
| " | 50 | 10 to 65 | 1.48 | 1.82 | 2.10 |
| " | 0 | −22 to 61 | 1.28 | 1.43 | 1.48 |

EXAMPLE 31

The TN display elements were prepared in accordance with Example 30 except for using an improver mixture of 60 wt% of p-n-propylbenzylidene-p'-ethoxyaniline and 40 wt% of p-n hexylbenzylidene-p'-n-propoxyaniline. The same tests of the TN display elements were carried out. The results are shown in Table 3.

Table 3

| $N_p$ liquid crystal | concentration of improver (wt.%) | nematic phase range (° C) | $V_{th}$-⅔ ($V_{op}$) | $V_{ope}$-¼ ($V_{op}$) | $V_{th}$-¼ ($V_{op}$) |
|---|---|---|---|---|---|
| PBCA + HBCA (40%) (60%) | 5 | −20 to 62 | 1.22 | 1.36 | 1.60 |
| " | 10 | −18 to 63 | 1.19 | 1.32 | 1.53 |
| " | 15 | −15 to 64 | 1.22 | 1.35 | 1.56 |
| " | 20 | −10 to 65 | 1.25 | 1.39 | 1.68 |
| " | 25 | −5 to 66 | 1.29 | 1.47 | 1.80 |
| " | 30 | −2 to 67 | 1.34 | 1.50 | 1.88 |
| " | 35 | 0 to 67 | 1.40 | 1.73 | 1.94 |
| " | 40 | 10 to 68 | 1.45 | 1.82 | 1.99 |

Table 3-continued

| $N_p$ liquid crystal | concentration of improver (wt.%) | nematic phase range (° C) | $V_{th}^{-\frac{3}{4}}$ $(V_{op})$ | $V_{ope}^{-\frac{3}{4}}$ $(V_{op})$ | $V_{th}^{-\frac{1}{4}}$ $(V_{op})$ |
|---|---|---|---|---|---|
| " | 50 | 25 to 70 | 1.49 | 1.91 | 2.10 |
| " | 0 | −22 to 61 | 1.28 | 1.43 | 1.48 |

EXAMPLE 32

The nematic liquid crystals of Example 30 were charged into the cell used in Example 1 to prepare the TN display elements. The same tests of the TN display elements were carried out. The results are shown in Table 4.

Table 4

| $N_p$ liquid crystal | concentration of improver (wt.%) | nematic phase range (° C) | $V_{th}^{-\frac{3}{4}}$ $(V_{op})$ | $V_{op}^{-\frac{3}{4}}$ $(V_{op})$ | $V_{th}^{-\frac{1}{4}}$ $(V_{op})$ |
|---|---|---|---|---|---|
| PBCA + HBCA (40%) (60%) | 5 | −21 to 63 | 1.04 | 1.13 | 1.52 |
| " | 10 | −20 to 63 | 1.00 | 1.05 | 1.42 |
| " | 15 | −18 to 63 | 1.01 | 1.11 | 1.49 |
| " | 20 | −16 to 64 | 1.11 | 1.20 | 1.57 |
| " | 25 | −15 to 64 | 1.22 | 1.33 | 1.67 |
| " | 30 | −12 to 64 | 1.32 | 1.46 | 1.75 |
| " | 35 | −10 to 64 | 1.36 | 1.56 | 1.87 |
| " | 40 | −5 to 64 | 1.40 | 1.67 | 1.90 |
| " | 50 | 10 to 65 | 1.47 | 1.67 | 2.00 |
| " | 0 | −32 to 61 | 1.10 | 1.23 | 1.34 |

EXAMPLE 33

The nematic liquid crystals of Example 31 were charged into the cell used in Example 1 to prepare the TN display elements. The same tests of the TN display elements were carried out. The results are shown in Table 5.

Table 5

| $N_p$ liquid crystal | concentration of improver (wt.%) | nematic phase range (° C) | $V_{th}^{-\frac{3}{4}}$ $(V_{op})$ | $V_{op}^{-\frac{3}{4}}$ $(V_{op})$ | $V_{th}^{-\frac{1}{4}}$ $(V_{op})$ |
|---|---|---|---|---|---|
| PBCA + HBCA (40%) (60%) | 5 | −20 to 62 | 1.05 | 1.18 | 1.51 |
| " | 10 | −18 to 63 | 1.03 | 1.18 | 1.40 |
| " | 15 | −15 to 64 | 1.05 | 1.21 | 1.45 |
| " | 20 | −10 to 65 | 1.13 | 1.25 | 1.53 |
| " | 25 | −5 to 66 | 1.21 | 1.33 | 1.61 |
| " | 30 | −2 to 67 | 1.28 | 1.41 | 1.69 |
| " | 35 | 0 to 67 | 1.33 | 1.49 | 1.75 |
| " | 40 | 10 to 68 | 1.39 | 1.56 | 1.80 |
| " | 50 | 25 to 70 | 1.44 | 1.65 | 1.90 |
| " | 0 | −22 to 61 | 1.10 | 1.23 | 1.33 |

EXAMPLE 34

The TN display elements were prepared in accordance with Example 30, except for using the improver mixture of 19 wt% of p-methoxybenzylidene-p'-n-butylaniline (MBBA), 53 wt% of p-ethoxybenzylidene-p'-n-butylaniline (EBBA), 18wt% of p-ethoxybenzylidene-p'-n-heptylaniline (EBH$_p$A) and 10 wt% of p-methoxybenzylidene-p'-n-heptylaniline (MBH$_p$A) formed by mixing equal weights of MBBA, EBBA and EMH$_p$A. The same tests of the TN display elements were carried out. The results are shown in Table 6.

Table 6

| $N_p$ liquid crystal | concentration of improver (wt.%) | nematic phase range (° C) | $V_{th}^{-\frac{3}{4}}$ $(V_{op})$ | $V_{op}^{-\frac{3}{4}}$ $(V_{op})$ | $V_{th}^{-\frac{1}{4}}$ $(V_{op})$ |
|---|---|---|---|---|---|
| PBCA + HBCA | | | | | |

Table 6-continued

| $N_p$ liquid crystal | concentration of improver (wt.%) | nematic phase range (° C) | $V_{th}^{-\frac{3}{4}}$ $(V_{op})$ | $V_{op}^{-\frac{3}{4}}$ $(V_{op})$ | $V_{th}^{-\frac{1}{4}}$ $(V_{op})$ |
|---|---|---|---|---|---|
| (40%) (60%) | 5 | −20 to 62 | 1.16 | 1.35 | 1.60 |
| " | 10 | −18 to 62 | 1.10 | 1.30 | 1.54 |
| " | 15 | −16 to 63 | 1.13 | 1.36 | 1.59 |
| " | 20 | −14 to 63 | 1.19 | 1.45 | 1.65 |
| " | 25 | −12 to 64 | 1.25 | 1.53 | 1.74 |
| " | 30 | −9 to 64 | 1.33 | 1.62 | 1.82 |
| " | 35 | −6 to 64 | 1.41 | 1.71 | 1.87 |
| " | 40 | −8 to 65 | 1.46 | 1.74 | 1.90 |
| " | 0 | −22 to 61 | 1.28 | 1.43 | 1.48 |

EXAMPLE 35

The TN display elements were prepared in accordance with Example 34 except for using the improver mixture of 9 wt% of MBBA, 56 wt% of EBBA, 21 wt% of EBH$_p$A and 14 wt% of MBH$_p$A formed by mixing MBBA, EBBA and EBH$_p$A in the ratio of 11 : 11 : 18. The same tests of the TN display elements were carried out. The results are shown in Table 7.

Table 7

| $N_p$ liquid crystal | concentration of improver (wt.%) | nematic phase range (° C) | $V_{th}^{-\frac{3}{4}}$ $(V_{op})$ | $V_{ope}^{-\frac{3}{4}}$ $(V_{op})$ | $V_{th}^{-\frac{1}{4}}$ $(V_{op})$ |
|---|---|---|---|---|---|
| PBCA + HBCA (40%) (60%) | 5 | −20 to 60 | 1.16 | 1.35 | 1.60 |
| " | 10 | −18 to 62 | 1.10 | 1.30 | 1.54 |
| " | 15 | −16 to 63 | 1.13 | 1.37 | 1.60 |
| " | 20 | −14 to 64 | 1.20 | 1.46 | 1.64 |
| " | 25 | −11 to 65 | 1.24 | 1.53 | 1.74 |
| " | 30 | −8 to 65 | 1.34 | 1.63 | 1.82 |
| " | 35 | 1 to 66 | 1.40 | 1.70 | 1.87 |
| " | 40 | 12 to 67 | 1.47 | 1.74 | 1.90 |
| " | 0 | −22 to 61 | 1.28 | 1.43 | 1.48 |

EXAMPLE 36

The nematic liquid crystals of Example 34 were charged into the cell used in Example 1 to prepare the TN display elements. The same tests of the TN display elements were carried out. The results are shown in Table 8.

Table 8

| $N_p$ liquid crystal | concentration of improver (wt.%) | nematic phase range (° C) | $V_{th}^{\frac{3}{4}}$ $(V_{op})$ | $V_{ope}^{-\frac{3}{4}}$ $(V_{op})$ | $V_{th}^{-\frac{1}{4}}$ $(V_{op})$ |
|---|---|---|---|---|---|
| PBCA + HBCA (40%) (60%) | 5 | −20 to 62 | 0.99 | 1.16 | 1.51 |
| " | 10 | −18 to 62 | 0.92 | 1.12 | 1.45 |
| " | 15 | −16 to 63 | 0.95 | 1.16 | 1.52 |
| " | 20 | −14 to 63 | 1.03 | 1.24 | 1.57 |
| " | 25 | −12 to 64 | 1.13 | 1.35 | 1.66 |
| " | 30 | −9 to 64 | 1.24 | 1.45 | 1.75 |
| " | 35 | −6 to 64 | 1.31 | 1.52 | 1.84 |
| " | 40 | 8 to 65 | 1.35 | 1.55 | 1.88 |
| " | 0 | −22 to 61 | 1.10 | 1.23 | 1.34 |

EXAMPLE 37

The nematic liquid crystals of Example 35 were charged into the cell used in Example 1 to prepare the TN display elements. The same tests of the TN display elements were carried out. The results are shown in Table 9.

Table 9

| $N_p$ liquid crystal | concentration of improver (wt.%) | nematic phase range (° C) | $V_{th}\text{-}\frac{1}{3}$ ($V_{op}$) | $V_{ope}\text{-}\frac{2}{3}$ ($V_{op}$) | $V_{th}\text{-}\frac{1}{2}$ ($V_{op}$) |
|---|---|---|---|---|---|
| PBCA + HBCA (40%) (60%) | 5 | −20 to 62 | 1.00 | 1.17 | 1.51 |
| " | 10 | −18 to 62 | 0.92 | 1.12 | 1.45 |
| " | 15 | −16 to 63 | 0.96 | 1.17 | 1.52 |
| " | 20 | −14 to 64 | 1.03 | 1.25 | 1.57 |
| " | 25 | −11 to 65 | 1.13 | 1.35 | 1.66 |
| " | 30 | −8 to 65 | 1.23 | 1.45 | 1.75 |
| " | 35 | 1 to 66 | 1.32 | 1.52 | 1.84 |
| " | 40 | 12 to 67 | 1.36 | 1.55 | 1.88 |
| " | 0 | −22 to 61 | 1.10 | 1.23 | 1.33 |

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A liquid crystal electro-optical display element which comprises a nematic liquid crystal composition having positive dielectric anisotropy which consists essentially of a p-n-alkylbenzylidene-p'-cyanoaniline having the formula

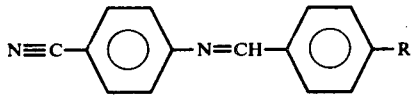

wherein R represents n-propyl or n-hexyl; or a mixture thereof; and an improver selected from the group consisting of:
1. 3 to 10 wt.% of a p-n-alkylcyanobenzene having the formula

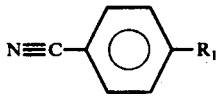

wherein $R_1$ represents n-propyl, n-butyl, n-pentyl or n-hexyl; or a mixture thereof;
2. 5 to 50 wt.% of a p-alkylbenzylidene-p'-alkoxyaniline having the formula

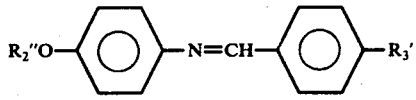

wherein $R_2''$ and $R_3'$ are respectively methyl, ethyl, n-propyl, n-butyl, n-pentyl, n-hexyl, n-heptyl or n-octyl; or a mixture thereof; and
3. 5 to 50 wt.% of a p-alkoxybenzylidene-p'-n-alkylaniline having the formula

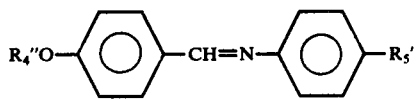

wherein $R_4''$ represents methyl or ethyl and $R_5'$ represents n-butyl or n-heptyl; or a mixture thereof.

2. A liquid crystal electro-optical display element which comprises a nematic liquid crystal composition having positive dielectric anisotropy which consists essentially of a p-n-alkylbenzylidene-p'-cyanoaniline having the formula

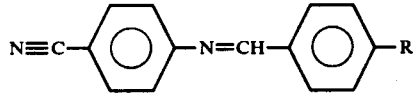

wherein R represents n-propyl or n-hexyl; or a mixture thereof; and an improver selected from the group consisting of:
1. 3 to 10 wt.% of a p-n-alkylcyanobenzene having the formula

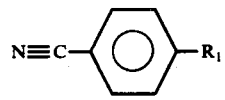

wherein $R_1$ represents n-propyl, n-butyl, n-pentyl or n-hexyl; or a mixture thereof; and
2. 5 to 50 l wt.% of a p-alkylbenzylidene-p'-alkoxyaniline having the formula

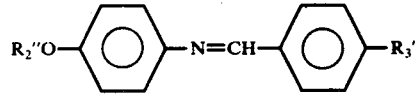

wherein $R_2''$ and $R_3'$ are respectively methyl, ethyl, n-propyl, n-butyl, n-pentyl, n-hexyl, n-heptyl or n-octyl; or a mixture thereof.

3. The liquid crystal electro-optical display element according to claim 1, wherein the nematic liquid crystal composition fills a cell having a pair of plates and a pair of electrodes connected to inner surfaces of the cell, said electrodes being coated with a thin film of a material providing an orientable microstructure capable of causing sympathetic alignment of said liquid crystal.

4. The liquid crystal electro-optical display element according to claim 3, wherein the electrodes are coated with a slant deposition of SiO or a rubbed poly-p-xylene.

5. The liquid crystal electro-optical display element according to claim 1, wherein 3 14 10 wt% of said p-n-alkyl cyanobenzene, 5–50 wt% of said p-alkylbenzylidene-p'-alkoxyaniline or 5–50 wt% of said p-alkoxybenzylidene-p'-n-alkylaniline is admixed with a mixture of p-n-propylbenzylidene-p'-cyanoaniline and p-n-hexylbenzylidene-p'-cyanoaniline.

6. The liquid crystal electro-optical display element according to claim 1, wherein the p-alkoxybenzylidene-p'-alkylaniline is prepared by mixing at least one of p-methoxybenzylidene-p-n-butylaniline and p-ethoxybenzylidene-p'-n-butylaniline and at least one of p-methoxybenzylidene-p'-n-heptylaniline and p-ethoxybenzylidene-p'-n-heptylaniline.

* * * * *